May 27, 1958
W. H. SCHMELING
2,835,924
METHOD OF MOLDING RUBBER FOAM
LATEX STRIPS AND THE LIKE
Filed Jan. 18, 1954
2 Sheets-Sheet 1
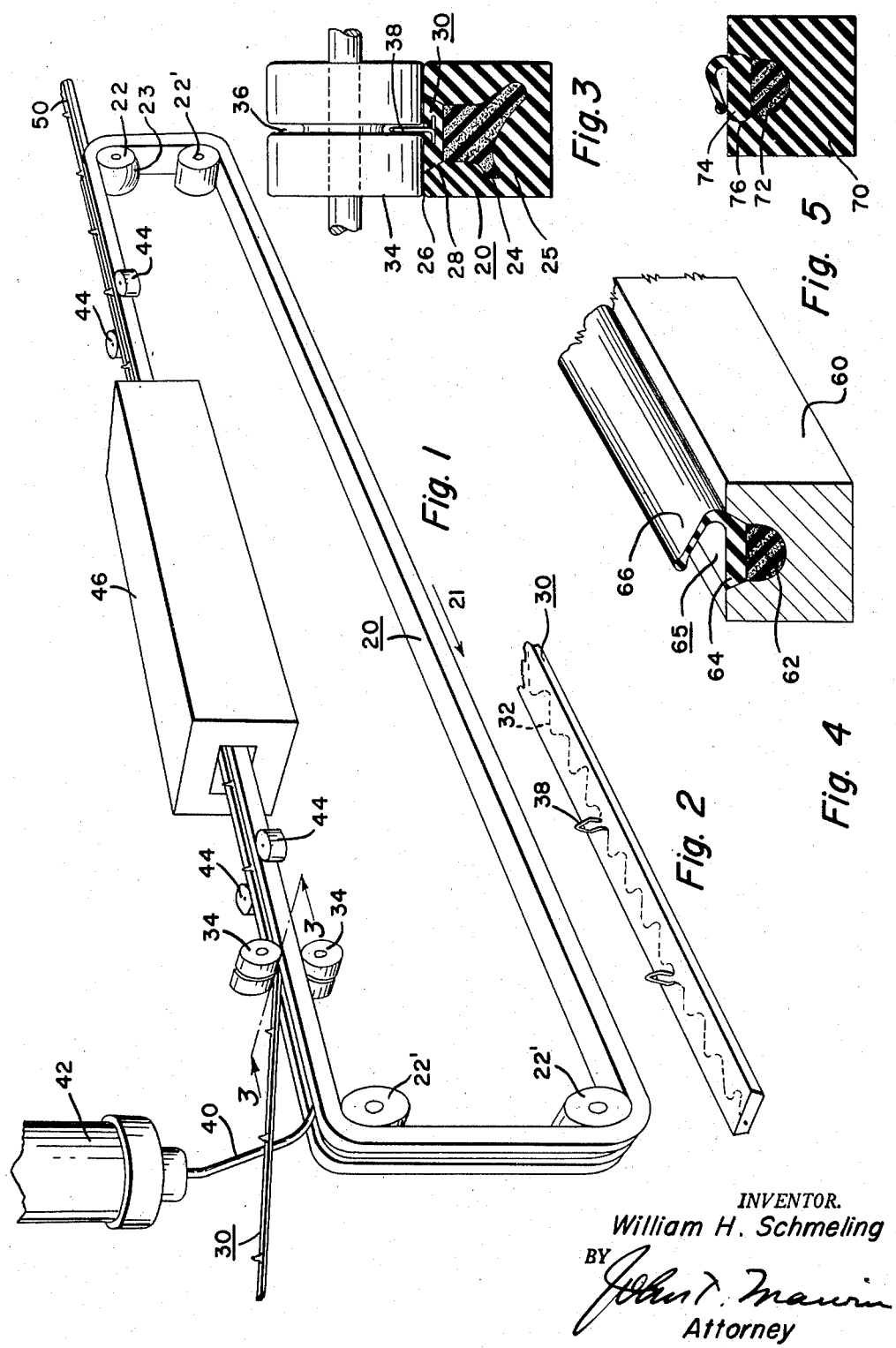
INVENTOR.
William H. Schmeling
BY
Attorney May 27, 1958
W. H. SCHMELING
2,835,924
METHOD OF MOLDING RUBBER FOAM
LATEX STRIPS AND THE LIKE
Filed Jan. 18, 1954
2 Sheets-Sheet 2
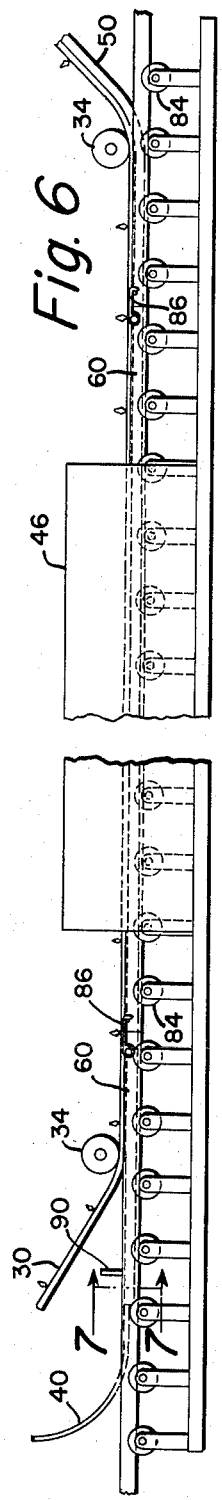
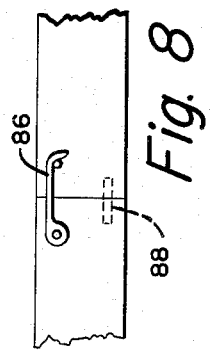
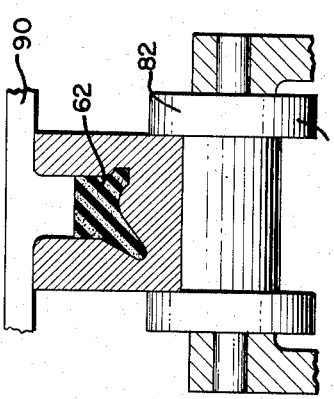
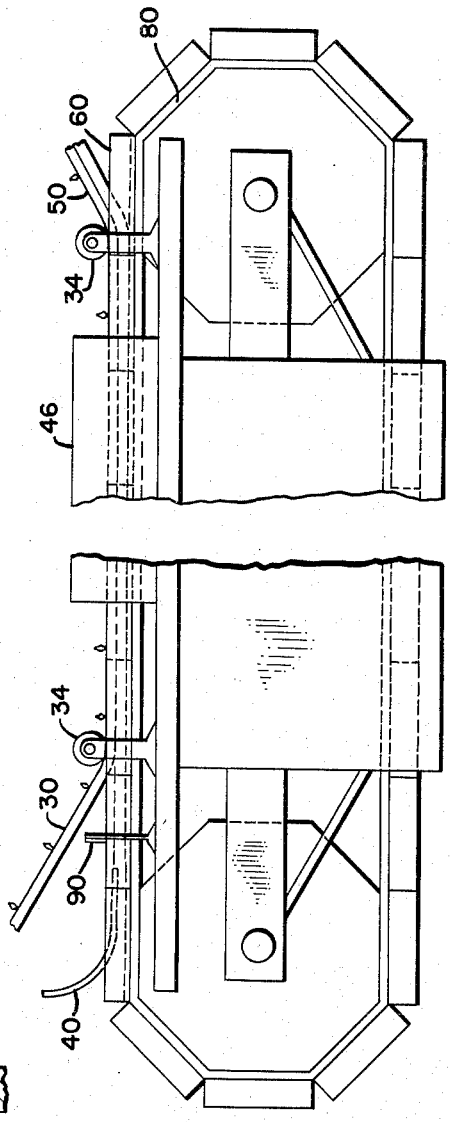
INVENTOR.
William H. Schmeling
BY John T. Marvin
His Attorney

United States Patent Office 2,835,924
Patented May 27, 1958

2,835,924

METHOD OF MOLDING RUBBER FOAM LATEX STRIPS AND THE LIKE

William H. Schmeling, Dayton, Ohio, assignor to General Motors Corporation, Detroit, Mich., a corporation of Delaware Application January 18, 1954, Serial No. 404,576

5 Claims. (Cl. 18—53)

This invention relates to a continuous method for making elongate strips of moldable material. More specifically the invention is directed to operations on latex foam and other similar materials.

It is an object of the present invention to provide a method wherein an elongated mold cavity is progressively filled with a flowable foamy moldable material at a low but highly uniform internal pressure throughout the length of the mold cavity. Specifically, the method of this invention comprehends the injection of a foamy flowable material from a nozzle into a moving closed mold cavity at a substantially constant and desired low pressure while simultaneously and relatively moving a nozzle along the length of a mold cavity to effect an even distribution of the foamy material throughout the mold cavity at any desired low internal pressure of the material.

Another object of the present invention is to provide a method for continuously molding a laminated elastomeric strip wherein one of the laminated portions is formed of fluid foamy material in a mold cavity that is maintained closed by a preformed portion of the laminated strip. This object is materialized by preforming a portion of the strip of elastomeric material and using this portion to close an open cavity in a mold part so that an ungelled fluid foamy compound may be progressively injected directly into the mold cavity from a relatively stationary nozzle located on an end of the tube that extends between the separated strip portion and mold part into the closed mold cavity formed between the strip portion and the mold part as the portion and part continuously move to provide a mold cavity that continually moves relative to the filling nozzle.

A further object of the present invention is to progressively close a moving open mold cavity with a preformed portion of a laminated elastomeric strip so that a moldable elastomeric material in fluid form may be continuously injected directly into the closed mold cavity and progressively and continuously form a laminated elastomeric strip when the material sets within the mold cavity and assumes the shape thereof.

Further objects and advantages of the present invention will be apparent from the following description reference being had to the accompanying drawings wherein a preferred embodiment of the present invention is clearly shown.

In the drawing:

Figure 1 diagrammatically in perspective shows one embodiment of the present invention.

Figure 2 in perspective shows a broken away portion of a laminating strip portion of an elastomeric strip.

Figure 3 is a view partially in section along line 3—3 in Figure 1 showing a roller applying the laminating strip in a mold cavity.

Figure 4 is a view in perspective of a portion of a mold part and preformed strip portion.

Figure 5 is a view in section of a modification of the invention as shown in Figure 3.

Figure 6 diagrammatically shows another modification of the present invention.

Figure 7 is a view partially in section along line 7—7 in Figure 6.

Figure 8 shows one form of a clamp for holding two mold parts.

Figure 9 diagrammatically shows still another modification of the present invention.

In the drawings, and in Figure 1 particularly, wherein various parts of one embodiment of the present invention are diagrammatically shown, the numeral 20 designates an endless flexible mold part, preferably made from elastomeric material, that is continuously moved in the direction of arrow 21 and maintained under a suitable tension as it passes over rollers 22 and 22' by driving means not shown. Mold part 20 has a continuously extending cavity 24 exposed to a surface 26 by an opening 28 that preferably has inclined sides so that a preformed portion of a strip or cork 30 may be tightly and correctly positioned therein to form a closed mold cavity designated as numeral 25 in a manner which will become hereinafter apparent. The specific form of the strip subsequently formed in the mold cavity 25 may be of any desired shape and in the form illustrated may have a cross-sectional shape designed to mold an automobile door sealing strip similar to the strip disclosed in Patent 2,579,072, filed March 15, 1951, by Edward P. Harris as assigned to the assignee of the present invention.

The preformed strip portion 30 received in opening 28 of mold part 20 is preferably of a substantial length and may be formed by any suitable method such as molding or extruding, as well known to those skilled in the art, and when so formed may have a reinforcing element 32 embedded therein and is continuously moved and directed into the opening 28 by a suitable apparatus, not shown where it is pressed into position by rollers 34 as the mold part 20 continues to move. The insertion of strip 30 into opening 28 by rollers 34 is shown in Figure 3 and from the drawing it is apparent that if reinforced strip such as shown in Figure 2 is employed, suitable provisions, such as a peripheral groove 36, must be provided on roller 34 so the tips 38 of the reinforcing element 32 may be accommodated.

A filling nozzle 40 leading from a supply chamber 42 extends into the open mold cavity 24 before it has been closed by the strip 30 and extends a suitable distance into the mold cavity 25 after it has been closed so the flowable material in chamber 42 may be longitudinally injected into the mold cavity 25 through a nozzle tip, not shown, at substantially atmospheric pressure and be directed to the central portion of the cross section of mold cavity 24 in the direction of travel of mold part 20 and the preformed corking strip 30. The two pressure rollers 34 are preferably located in a plane normal to the travel of the closed mold to tightly force the strip 30 into opening 28 to minimize the escape of molding material around the edges of the corking strip 30.

A plurality of suitably located rollers 44 axially align the parts defining the closed mold cavity 25 at the entrance and exit ends of the heating apparatus 46, the purpose of which will be hereinafter described, so that the mold cavity is in correct axial alignment as it passes through the heating chamber 46. The roller 22 may have its outer peripheral surface 23 curved to flex the elastomeric material of the mold part 20 and thereby facilitate the continuous removal of the strip 50 as it passes from mold cavity 24 in mold part 20 which in turn continues to travel in a reusable form.

It is apparent that during the passage of the molding parts through the heating chamber 46, the molding material contained in the mold cavity will assume the shape thereof and may be simultaneously bonded to the preformed strip portion 30 to provide a laminated strip 50 which may have a reinforcing element 30 contained therein if desired. Further it is apparent that if the mold part 20 is of elastomeric material the strip molded in mold cavity 25 must not adhere to the surface portions of the mold cavity 24 when the material is being formed and bonded to the preformed portion of the strip. This can be readily accomplished by suitably coating the mold with "Carbowax" or other suitable mold lubricants by an apparatus, not shown, or by forming the mold part 20 of a material to which the molded material will not adhere during the heating step. These objectives are well understood and may be readily accomplished by those well skilled in the art.

In Figure 4 a metallic mold part 60 may be used in place of the elastomeric mold part 20, shown in Figure 2, to form a laminated elastomeric strip 65. This metal mold part may be used with any suitable apparatus such as illustrated in Figures 6 and 9. To illustrate another embodiment the corking strip 64 is formed without a reinforcing element and has an integral attaching tongue 66 which may be used to attach the completed strip 65 to a support structure, not shown. It is apparent other integral attaching arrangements may be formed on the preformed corking portion 64 of the laminated strip 65 or the attaching arrangements may be omitted if desired providing the corking strip 64 is sized to close the open mold cavity 62 wherein the fluid material to be molded is progressively injected as heretofore set forth. The mold part 60 may be formed of a plurality of individual mold segments made of a suitable metal or metal alloy material as set forth in application Serial No. 404,554, concurrently filed herewith and assigned to the assignee of the present invention.

In the embodiment shown in Figure 6, the closed mold cavity is formed as a series of individual mold segments 60 which are sequentially moved to form the extending length of mold cavity. In Figure 9, the metallic mold parts are formed of relatively short individual mold segments 60 that are hinged together as may be accomplished by attaching the segments 60 on a continuous elastomeric belt 80, so that the ends will abut and form a mold cavity of substantial length when the segments are in the axially aligned position. When the embodiment in Figure 6 is utilized, the mold parts may be of substantial length, for example, 10 feet, and are held in axial alignment by collars 82 on the conveyor rollers 84 which may be horizontally supported in any conventional manner. The ends of the mold segments 60, if desired, may be held in abutting relation by clamps 86 shown in Figures 6 and 8 to form a mold part of substantial length having extending cavity therein. This cavity is continuously moved relative to the filling nozzle 40 as the individual mold segments are continuously removed from the exit end of the apparatus and transferred to the entrance end of the apparatus. To aid in the aligning of the individual mold segments 60, as used in Figure 6, dowel pins 88 may be suitably secured on one of the ends of the mold segments 70. These pins 88, when used, are inserted into a suitably located hole in the ends of the mold segments 60, and will further maintain axial alignment between the traveling individual mold segments 60.

The apparatus and method described is particularly suitable for making sponge rubber strips of foam latex compound. Such foam latex compounds when in an ungelled condition are flowable to any desired degree and can be easily injected through a filling nozzle at a constant rate of flow to progressively fill a mold cavity at a uniform desired pressure. The internal pressure within the mold cavity need be no higher than that required to insure the complete filling of the mold cavity.

Further it is apparent the mold cavity may be filled before it is corked. This may be accomplished as in Figures 6 and 9 by flowing the fluid latex material directly from the nozzle 40 into the open metal mold cavity 62 and using a doctor blade 90 that is shaped to progressively scrape away any excess latex that may be present in the open cavity 62 in order that said cavity may be properly filled. This arrangement will cause the fluid foam latex to conform to the contour of the closed cavity after the preformed portion of the strip 30 is applied to the mold cavity by rollers 34 in a manner heretofore described. In all cases the final cured strip will have substantially the same density from end to end due to the uniform internal pressure of the molding material throughout the mold cavity. The ungelled flowable latex compound as it flows from a nozzle will flow and be in a continuous relation with the preformed portion of the strip so that it may be bonded thereto during the curing process. In this connection if the metallic portion of the mold 60 is to be used, it may be also suitably coated to prevent the gelled or cured foam from adhering thereto.

The specific compound and material used in the molding operation forms no part of this invention and the foregoing is merely exemplary of the many materials that can be used. It is apparent that the apparatus may be adjusted for any desired rate of travel and the length of heating chamber 46 and the temperatures thereof may be controlled to yield any desired result as is well known in the art.

The specific material used in the mold part 20, may be of any suitable elastomeric material such as butadiene styrene copolymers, butadiene acryonitrile copolymers, natural rubber, etc., mixtures of the above and any suitable material providing the material selected will have the proper degree of flexibility for the application involved and be able to withstand the temperatures of the setting or curing.

Further the materials used to form the preformed corking strip 30 may be of any of the materials used to form elastomeric mold part 20 or may be of sponge rubber, microporous rubber, or latex foam if desired and may be partially or fully cured before being used as a mold cork so that a final cure thereof may be accomplished during the heating step and may be bonded to the formed injected moldable material by any well known procedure such as cementing. In this connection if a proper nonadhering coating is used on mold part 20 or mold part 60 the cemented portion of the mold cork will not adhere to the mold part and will bond or vulcanize only with the injected material and thus provide a laminated strip that may be readily removed from the mold wherein a portion of the strip is formed. Manifestly the heating apparatus forms no part of this invention and merely facilitates the explanation thereof since heating is a necessary step in the curing of rubberlike compounds. If the compound requires no cure the heating step and apparatus may be eliminated. Further it is apparent that any suitable apparatus, not shown, may be used to remove the formed laminated strip 50 from the apparatus heretofore shown and described.

In Figure 5 a further modification of the invention is shown wherein the mold part 70 which may be of elastomeric material as mold part 20 in Figure 1 or of metallic material as mold part 60 in Figure 4 is used to continuously form a strip in a mold cavity 72 in a manner previously described. In this embodiment the preformed strip 74 and the opening 76 leading to cavity 72 are formed so that an interlock is formed therebetween when the strip 74 is inserted into opening 76 and thus permit a higher molding pressure to be used. Manifestly the interlock may be accomplished by other shapes than is shown in the figure wherein the bowed ends of strip 74 are received in the complementary bowed surfaces of opening 76. These other shapes may include serrated surfaces, hooking surface portions or any other shape that will increase the holding and positioning of the strip 74 in the opening 76 during molding operation and will permit the strip 74 when molded to be removed without injury from the cavity 72 after the strip is cured or set therein.

In connection with the method and apparatus set forth herein it is to be noted that other methods and apparatus may be used to form strips similar to the type herein disclosed. These are disclosed in applications Serial Numbers 405,554, 404,468, and now abandoned, 404,649, now Patent No. 2,817,875, 404,566, currently filed herewith and assigned to the assignee of the present invention; and further another method and apparatus for forming strips similar to the type disclosed herein is set forth in copending application Serial No. 191,444, now Patent 2,668,987, assigned to the assignee of the present invention.

While the embodiment of the present invention as herein disclosed, constitutes a preferred form, it is to be understood that other forms might be adopted.

What is claimed is as follows:

1. In a method for continuously forming a composite elastomeric strip wherein one of the portions thereof is formed of a molded fluid foamy material, the steps comprising in combination; sequentially moving a plurality of individual segments each having an open cavity along one surface into aligned abutting relation for forming an extending mold part having an open cavity of predetermined length therealong, moving an indeterminate length of a preformed strip portion from a separated to an engaging position with said mold part to form a closed elongated mold cavity, filling said elongated mold cavity progressively with a fluid foamy compound by continuously flowing said compound into said cavity through a filling nozzle extending directly into said cavity while moving said mold cavity lengthwise relative to said nozzle, maintaining said mold cavity closed while the foamy material therein sets and integrally attaches to the preformed portion of said strip and forms a composite strip having a portion thereof having the shape of said cavity, and progressively removing said composite strip consisting of a portion of said preformed portion and the formed portion of foamy material from said cavity while said cavity contiues to travel in a reusable form.

2. The method as set forth in claim 1 including the step of associating reinforcing elements with said preformed strip portion for forming a reinforced elastomeric strip.

3. A method of continuously forming a composite elastomeric strip consisting of a portion of preformed elastomeric material and a portion of material formed of fluid foamy material intimately attached to said preformed portion, the steps including, inserting said preformed portion into a moving length of open mold cavity for forming a closed mold cavity therewith, progressively filling said closed cavity with fluid foamy material while said cavity continues to travel, moving said mold cavity over a predetermined length of travel sufficient to permit the foamy material contained therein to set and form said composite strip and finally removing said composite strip from said mold cavity while said mold cavity continues to travel in a reusable form.

4. In a method of continuously forming a composite elastomeric strip consisting of a preformed portion of elastomeric material and a portion of material formed of fluid foamy material intimately attached to said preformed portion the steps comprising: positioning said preformed portion relative to a longitudinally extending open mold cavity for forming a closed mold cavity therewith, progressively filling said closed mold cavity with fluid foamy material while said cavity continues to travel, moving said mold cavity a predetermined length of travel sufficient to permit the foamy material contained therein to set and form said composite strip, and finally removing said composite strip from said mold cavity while said cavity continues to travel in a reusable form.

5. A method of continuously forming a composite elastomeric strip consisting of a portion of preformed elastomeric material and a portion of material formed of fluid material intimately attached to said preformed portion, the steps including: progressively filling a moving length of open mold cavity to a predetermined depth with a fluid material, progressively inserting said preformed portion into said cavity for forming a closed mold cavity filled with said material, moving said filled cavity over a predetermined length of travel sufficient to permit the material in said closed cavity to set and form said composite strip and finally removing said composite strip from said cavity while the mold cavity continues to travel in a reusable form.

References Cited in the file of this patent

UNITED STATES PATENTS

| | | |
|---|---|---|
| 842,356 | Stone et al. | Jan. 29, 1907 |
| 2,109,190 | Coffey | Feb. 22, 1938 |
| 2,271,058 | Binns | Jan. 27, 1942 |
| 2,288,611 | De Wyk | July 7, 1942 |
| 2,319,042 | De Wyk, Jr. | May 11, 1943 |
| 2,373,593 | Pease | Apr. 10, 1945 |
| 2,422,266 | Steinke | June 17, 1947 |
| 2,668,987 | Harris et al. | Feb. 16, 1954 |